April 1, 1969   W. H. BARKOW   3,436,139
TORSIONAL LIGHT DEFLECTOR
Filed July 20, 1965
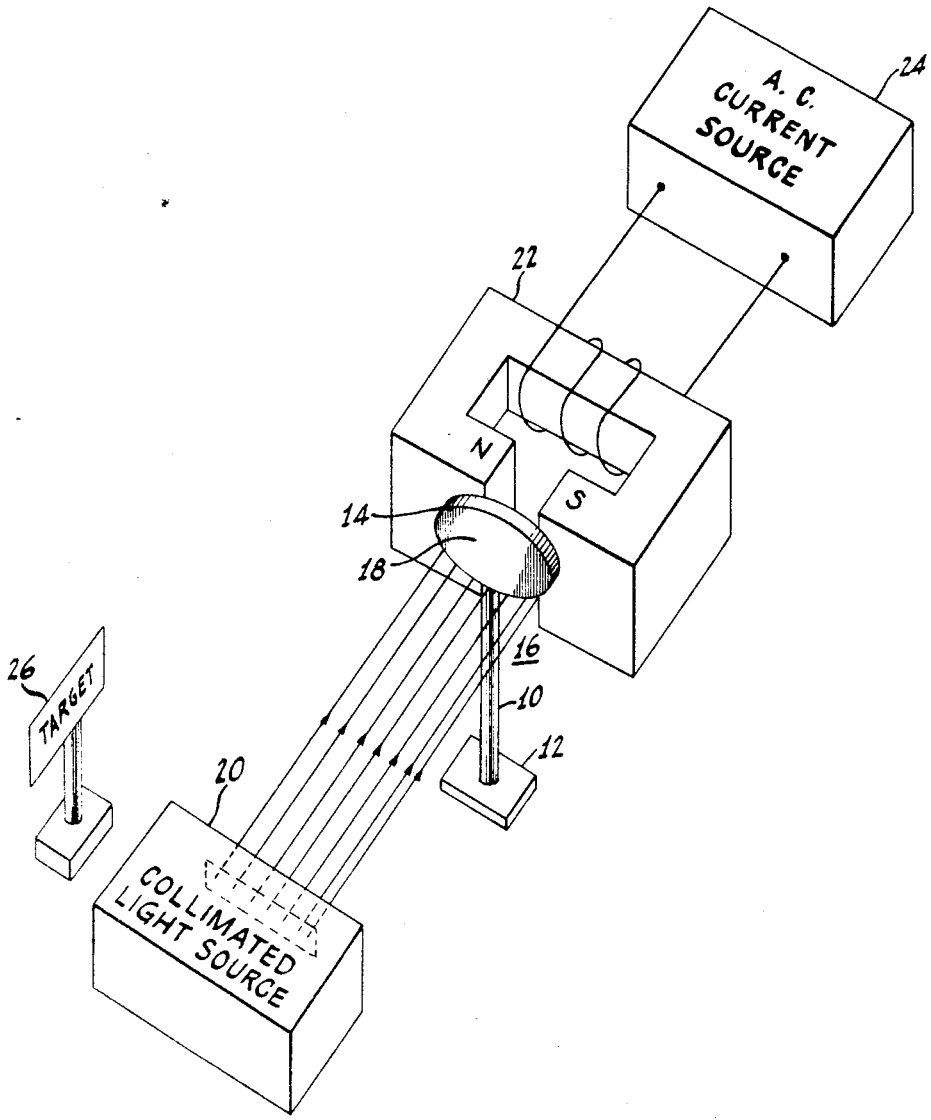
INVENTOR.
WILLIAM H. BARKOW
BY Eugene M. Whitacre
Attorney United States Patent Office 3,436,139
Patented Apr. 1, 1969

3,436,139
TORSIONAL LIGHT DEFLECTOR
William H. Barkow, Pennsauken, N.J., assignor to Radio Corporation of America, a corporation of Delaware
Filed July 20, 1965, Ser. No. 473,329
Int. Cl. G02b *17/00;* H04n *3/00;* H01j *3/14*
U.S. Cl. 350—6
4 Claims

ABSTRACT OF THE DISCLOSURE

A light deflecting arrangement especially useful in high speed, large angular deflection scanning systems comprising a longitudinal member of material having a first torsion resonant frequency, a light reflecting surface attached to the member to form a deflector assembly therewith having a second torsion resonant frequency substantially equal to one-third the torsion resonant frequency of the longitudinal member, and means for applying a torsion force to the member to rotate the aforementioned surface.

This invention relates to light deflecting arrangements and, more particularly, to a torsional light deflecting arrangement for use in high speed, large angular deflection scanning systems.

Many arrangements for deflecting a beam of light are known in the prior art. One such arrangement deflects the beam by changing the index of refraction of a reflecting material upon which the light is incident, either by applying an electrical field to the material (electro-optic) or by applying some external mechanical stress to it (piezo-optic). Another arrangement employs a tuning fork device, with appropriate reflecting accessories attached to the tines of the fork to manipulate the light. Other arrangements include the well known electromechanical scanning approach using a rotating mirror to deflect the beam and the somewhat newer digital scanning approach using electro-optical and birefrigent crystals.

The most useful figure of merit for light beam deflecting arrangements is, in general, the maximum number of beam diameters that may be deflected. Of the many different arrangements known, the one which provides the greatest number of beam diameters deflection is the electromechanical rotating mirror type arrangement. While such an arrangement can be used where large angular beam deflection is required, bearing and stability considerations generally limit its use to slow scan operations. Similarly, with the tuning fork type arrangement—since it cannot suitably provide large angular deflection at high scan rates it too is limited, by and large, to slow scan usage. Nor do the index of refraction or digital scanning type arrangements provide satisfactory solutions—large angular deflection can be obtainable with either, but only by cascading individual units forming, as a result, a highly complex and generally unworkable arrangement.

It is an object of the present invention, therefore, to provide a simply constructed light deflecting arrangement for use in high speed scanning systems where large angular deflections are required.

In accordance with the invention, such an arrangement includes, first of all, a longitudinal member of material having a relatively high $S_m c$ product. It also includes a light reflecting surface positioned along the longitudinal member and towards which a beam of light is directed. It additionally includes means for applying a torsional force to the member to rotate the aforementioned surface.

For a better understanding of the persent invention, together with further objects thereof, reference is had to the following description, taken in connection with the accompanying drawing, and its scope will be pointed out in the appended claims.

In the drawing, there is shown an isometric view of one form of torsional light deflecting arrangement constructed according to the principles of the present invention. As shown in the drawing, the arrangement includes a longitudinal metal member 10—a thin bar or rod, for example—connected at one end to a support 12. Member 10 is selected to be of a material having a relatively high $S_m c$ product, where $S_m$ represents the maximum allowable shear fatigue stress of the metal and $c$ represents the velocity of propagation of a shear wave along the member 10. In particular, the fatigue stress characteristic is selected so as to permit large amplitude vibrations of the member to be obtained while the propagation velocity characteristic is selected so as to permit those vibrations to be obtained at high frequencies of oscillation. As will be described below, it is these characteristic which permit the torsional light deflecting arrangement of the invention to be used in high speed, large angular deflection scanning systems.

These characteristics of fatigue stress and propagation velocity, as well as the effects they produce on vibrating bodies are fully described in W. P. Mason's book, Phyical Acoustics, volume 1, part B (Academic Press, New York, 1964). Starting at page 353, it is there pointed out that the figure of merit for longitudinal members undergoing torsional vibration is determined primarily by the $S_m c$ product of the material selected. In order to obtain a high particle velocity—and, therefore, large amplitude vibrations at high frequencies of oscillation—a material having a large value of $S_m c$ is required for the member. In one embodiment of the invention, an aluminum alloy was selected as the material for the member 10 because of its relatively high $S_m c$ product and because of its ready availability. Along with its relatively low internal damping, such a material provides the necessary characteristics set forth above.

Titanium alloys and other materials noted in Mason may similarly be used for the member 10.

The light deflecting arrangement of this form of the invention also includes a light-weight ceramic magnet 14 attached to the member 10 to form a deflector assembly 16. The magnet 14 may be of any ceramic material which does not demagnetize easily—a ferrite, for example. The ceramic is initially magnetized along its shortest dimension and has one of its surfaces treated so as to reflect light directed towards it. The ceramic may be joined to the member 10 by any attaching material capable of substantially translating a torsional force exerted on the deflector assembly 16 from the ceramic magnet 14 to the member 10.

Such an assembly as the deflector assembly 16 may be constructed by first taking a barium ferrite ceramic blank .020 inch thick and mechanically polishing both its surfaces. A coating of glass is then applied to one surface and polished optically flat to obtain a total thickness of ferrite and glass equal to .012 inch. A .1 inch diameter disc is then cut out and a reflective coating, such as aluminum, is evaporated onto the glass surface to complete the mirror-like light reflecting portion. The disc is then attached to a flattened portion of the member 10 by epoxy cement and magnetized perpendicular to the reflecting surface. The magnetization may be such that the reflecting surface of the disc becomes a "north" pole while the nonreflecting under surface becomes a "south" pole. This reflecting surface is indicated in the drawing by the numeral 18 and is capable of reflecting light directed at it from a laser or any other source of highly collimated light 20. The cylindrical disc .1 inch in diameter and .012 inch thick, represents the ceramic magnet 14 and is so attached to the member 10 that when the deflector assembly 16 is adjusted, the amount of light reaching its reflecting surface 18 from the source 20 is a maximum.

The light deflecting arrangement shown in the drawing additionally includes means for applying a torsional force to the deflector assembly 16 to rotate the reflecting surface 18. This means includes an electromagnetic driver 22 and an A.C. current source 24 for supplying power to the driver 22. The mirror-like magnet 14 is, as shown, substantially centered across the air gap of the driver 22, with its reflecting surface 18 facing away from the gap and towards the collimated light source 20. The light reflected from the surface 18 is thus directed towards a target, shown symbolically in the drawing as the surface 26.

In operation, the A.C. current supplied by the source 24 to the driver 22 causes a torsional force to be exerted on the deflector assembly 16. More particularly, the force is exerted directly on the nonreflecting surface of the ceramic 14, the surface nearest the air gap, and is translated through the magnet 14 and the epoxy join to the member 10. Once this torsional force is of sufficient magnitude to overcome external air losses and the internal damping losses of the member 10, and as long as it is sufficient to overcome them, the torsional force causes the magnet 14 to be rotated through a given angle. As is well known and understood, this angle is determined by the internal damping of the member 10 and, also, by the frequency of the supplied A.C. drive current—for a fixed drive current frequency, the lower the internal damping, the greater the angular rotation; while for a fixed internal damping, the closer the drive current frequency is to the torsion resonant frequency of the assembly 16, the more angular rotation there will be.

The torsion resonant frequency of the deflector assembly 16 can be determined from the well known torsion pendulum formula:

$$f = \frac{1}{2\pi}\sqrt{\frac{\pi\mu a^4}{2lI_m}} \qquad (1)$$

where $f$ = the torsion resonant frequency of the deflector assembly 16;
$\mu$ = the shear elastic constant of the member material;
$a$ = the radius of the member 10;
$l$ = the effective length of the member 10, i.e., the distance from the support 12 to the magnet 14; and
$I_m$ = the moment of inertia of the magnet 14.

The moment of inertia of the magnet 14, $I_m$, is that for a right circular cylinder of radius $r$, thickness $t$, and mass $m$ and is given by the standard expression:

$$I_m = m\left(\frac{r^2}{4} + \frac{t^2}{12}\right) \qquad (2)$$

when measured through the center of the cylinder perpendicular to the axis of the magnet 14.

Thus, by proper choice of dimensions and properties for the member 10 and the magnet 14, and of drive current frequency, a wide variety of deflection angles may be obtained for the magnet 14 of the torsional light deflecting arrangement. Since the light reflecting surface 18 of the magnet 14 rotates together with the magnet 14, the angular deflection of the light directed from the source 20 towards the surface 18 can be similarly controlled. It is to be noted, however, that there is a limit to the amount of angular deflection which the mirror-magnet can undergo. This limit is imposed primarily by the maximum stress the member 10 can withstand without being fatigued. As the amount of stress which can be withstood increases, so, too, does the maximum angular deflection possible. Reductions in the amount which can be withstood, on the other hand, are associated with decreases in the possible angular deflection.

The frequency with which these angular deflections occur, i.e., the scan rate for these deflections, is determined by the frequency of the drive current supplied by the A.C. source 24. But here, too, there is a limit to the deflection scan rate which can be obtained. This limit is properly established by, and moreover is directly proportional to the torsion resonant frequency of the deflector assembly 16. That is, the higher the torsion resonant frequency, the higher is the deflection scan rate while the lower the torsion resonant frequency the lower is the scan rate.

The torsional light deflecting arrangement of the present invention has thus far been described in an embodiment employing an electromagnetic driver (unit 22 in the drawing). In other embodiments, piezoelectric or magnetostrictive drivers may be used to apply the torsional force needed to start the longitudinal member vibrating, instead of the electromagnetic driver as shown. With such configurations, the ceramic magnet 14 may be eliminated and a light reflecting surface may be attached directly to the member 10, rather than by means of the previously used magnet. Alternatively, the member 10 itself may be polished at a position along its length to provide the necessary reflecting surface. Such configurations as these latter ones permit still higher deflection scan rates to be obtained—the limiting rate being determined by the torsional resonant frequency of the longitudinal member alone. Assuming this member to be in the nature of a cylindrical rod, this torsion resonant frequency is given by the expression:

$$f = \frac{l}{4}\sqrt{\frac{\rho}{\mu}} \qquad (3)$$

where $l$ = the length of the rod;
$\mu$ = the shear elastic constant of the rod material; and
$\rho$ = the density of the material.

This torsion resonant frequency of the member 10 by itself is several times greater than the torsion resonant frequency of the mirror-magnet—longitudinal member deflector assembly 16, as given by the expression (1).

It will be noted from expression (3) that by shortening the rod-like member, even higher deflection scan rates may be obtained. Such shortening is accompanied, however, by a reduction in the angular deflection possible. In selecting the particular length for the rod, therefore, some compromise must be struck between deflection angle and deflection speed.

The torsional light deflecting arrangement of the present invention is particularly useful in image scanning systems. In such systems, the scanning beam of light from the reflecting surface may be used to read information by transmission through, or reflection from, a surface upon which the information is stored. Alternatively, by modulating the scanning beam of light with an electric signal representative of an image in any well known manner, information can be written onto a surface.

The angular deflection provided by the deflector assembly 16 of the drawing is essentially sinusoidal in nature. This deflection can be made more linear by tuning the torsion resonant frequency of the member 10 to the third harmonic of the torsion resonant frequency of the mirror-magnet—longitudinal member deflector assembly 16. Assume, for example, that the deflection scan rate for the arrangement is selected to be 10 kc. As was previously mentioned, the angular deflection for such a scan rate will be a maximum when the torsion resonant frequency of the deflector assembly 16, as given in expression (1), is equal to this 10 kc. frequency. To obtain a linear deflection then, the torsion resonant frequency of the longitudinal member 10 by itself, as given by expression (3), would have to be 30 kc. Once a particular metal has been chosen for the member 10, expression (3) determines the length $l$ needed to resonate the member at this 30 kc.

frequency. Expression (1) then establishes the radius $a$ of the member 10 necessary for the entire deflector assembly 16 to be resonant at a 10 kc. frequency. It is in this manner that a particular deflector assembly 16 can be constructed to provide both high speed and large angular linear deflection of an incident beam of light.

What is claimed is:
1. A light deflecting arrangement comprising:
 a longitudinal member having a first torsion resonant frequency;
 a light reflecting surface positioned along said member and towards which a beam of light is directed, said surface forming an assembly with said longitudinal member having a second torsion resonant frequency substantially equal to one-third the torsion resonant frequency of said member to increase the linearity of light deflection produced in response to a substantially applied torsional force;
 and means for applying said torsional force to said longitudinal member to rotate said surface.
2. A light deflecting arrangement as defined in claim 1 wherein said longitudinal member is composed of material having a relatively high $S_m c$.
3. A light deflecting arrangement as defined in claim 1 wherein said light reflecting surface comprises a ceramic magnet attached to said member and having a mirrored surface for reflecting a beam of light directed towards it.
4. A light deflecting arrangement as defined in claim 3 wherein said last mentioned means applies a torsional force to said member to rotate said magnet and said surface at a frequency equal to the frequency of said applied torsional force.

References Cited

UNITED STATES PATENTS

| 2,034,583 | 3/1936 | Koch | 350—6 X |
| 2,090,853 | 8/1937 | Priess | 350—6 X |
| 2,993,403 | 7/1961 | Harries | 350—6 |
| 3,020,414 | 2/1962 | McKnight et al. | 350—6 X |
| 3,060,319 | 10/1962 | Greunke | 350—6 X |
| 3,156,759 | 11/1964 | Collen | 350—6 |
| 3,256,769 | 9/1966 | Matthews et al. | 350—6 X |
| 3,302,027 | 1/1967 | Fried et al. | 324—97 X |

FOREIGN PATENTS

| 252,387 | 12/1926 | Great Britain. |
| 461,417 | 2/1937 | Great Britain. |

DAVID SCHONBERG, *Primary Examiner.*

PAUL R. GILLIAM, *Assistant Examiner.*

U.S. Cl. X.R.

178—7.6; 250—235